(12) United States Patent
Browning

(10) Patent No.: US 11,351,644 B2
(45) Date of Patent: Jun. 7, 2022

(54) MORTISE CUTTING JIG AND ROUTER GUIDANCE SYSTEM FOR WOOD WORKING

(71) Applicant: Donald Browning, Batavia, OH (US)

(72) Inventor: Donald Browning, Batavia, OH (US)

( * ) Notice: Subject to any disclaimer, the term of this patent is extended or adjusted under 35 U.S.C. 154(b) by 209 days.

(21) Appl. No.: 16/926,293

(22) Filed: Jul. 10, 2020

(65) Prior Publication Data

US 2021/0146491 A1 May 20, 2021

Related U.S. Application Data

(60) Provisional application No. 62/936,992, filed on Nov. 18, 2019.

(51) Int. Cl.
*B27F 1/08* (2006.01)
*B23Q 9/00* (2006.01)
*B27F 5/02* (2006.01)
*B27C 5/10* (2006.01)

(52) U.S. Cl.
CPC .............. *B23Q 9/0014* (2013.01); *B27C 5/10* (2013.01); *B27F 1/08* (2013.01); *B27F 5/02* (2013.01); *B23Q 2703/02* (2013.01)

(58) Field of Classification Search
CPC ...... B27F 1/02; B27F 1/04; B27F 1/08; B27F 1/10; B27F 1/16; B27F 5/02; B23Q 9/0014; B27C 5/10
See application file for complete search history.

(56) References Cited

U.S. PATENT DOCUMENTS

| | | | | |
|---|---|---|---|---|
| 4,630,657 | A | * | 12/1986 | Obradovich ......... B23Q 9/0021 144/154.5 |
| 2003/0230359 | A1 | | 12/2003 | Schroeder |
| 2008/0251154 | A1 | | 10/2008 | Gill |
| 2009/0272463 | A1 | | 11/2009 | Smith |
| 2016/0136737 | A1 | | 5/2016 | Setchell et al. |
| 2018/0354086 | A1 | | 12/2018 | Grisley |

OTHER PUBLICATIONS

Mafe, Mortise router jig (Festool style), Feb. 22, 2012, https://www.lumberjocks.com/projects/61903 (Year: 2012).*
Ken Burton, K.I.S.S. Mortising Jig, 2015, woodcraftmagazine.com (Year: 2015).*

* cited by examiner

*Primary Examiner* — Matthew Katcoff
(74) *Attorney, Agent, or Firm* — Jenei LLC

(57) ABSTRACT

A wood working jig includes a fixed clamp plate positionable on a first side of a work piece and having a fixed top channel. The wood working jig includes a movable clamp plate positionable on a second side of the work piece opposite to the first side and having a movable top channel. The fixed and the movable clamp plates configured to be clamped to the work piece with wood clamps. The wood working jig includes a first and a second stop each engageable between the fixed and the movable top channels. The wood working jig includes a slide black (plate) having first and second guide blocks that each engage a selected one of the fixed and the movable top channels to guide translation of a router opening in the slide plate between the first and second stops.

13 Claims, 6 Drawing Sheets

MORTISE CUTTING JIG AND ROUTER GUIDANCE SYSTEM FOR WOOD WORKING

CLAIM OF PRIORITY UNDER 35 U.S.C. § 119

The present Application for Patent claims priority to Provisional Application No. 62/936,992 entitled "Mortise Cutting Jig and Router Guidance System for Wood Working," filed 18 Nov. 2019, and assigned to the assignee hereof and hereby expressly incorporated by reference herein.

BACKGROUND

1. Technical Field

The present disclosure generally relates to wood working jigs, and more specifically to wood working jigs capable of producing mortise and tenon joints.

2. Description of the Related Art

Wood working jigs are mounted to a work surface that supports a work piece such as a wood board. The wood working jig is adjusted to guide a wood working power tool such as a router to make recesses in the work piece that correspond to a tenon that is received to join to another work piece. Generally known wood working jigs for making mortise and tenon joints are limited in the choices for aligning the positioning of the recesses and limited in the size of work pieces that can be worked on.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

A wood working jig includes a fixed clamp plate positionable on a first side of a work piece and having a fixed top channel. The wood working jig includes a movable clamp plate positionable on a second side of the work piece opposite to the first side and having a movable top channel. The fixed and the movable clamp plates configured to be clamped to the work piece with wood clamps. The wood working jig includes a first and a second stop each engageable between the fixed and the movable top channels. The wood working jig includes a slide plate having first and second guide blocks that each engage a selected one of the fixed and the movable top channels to guide translation of a router opening in the slide plate between the first and second stops.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized, and that logical, architectural, programmatic, mechanical, electrical, and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

Figures 1, 2:
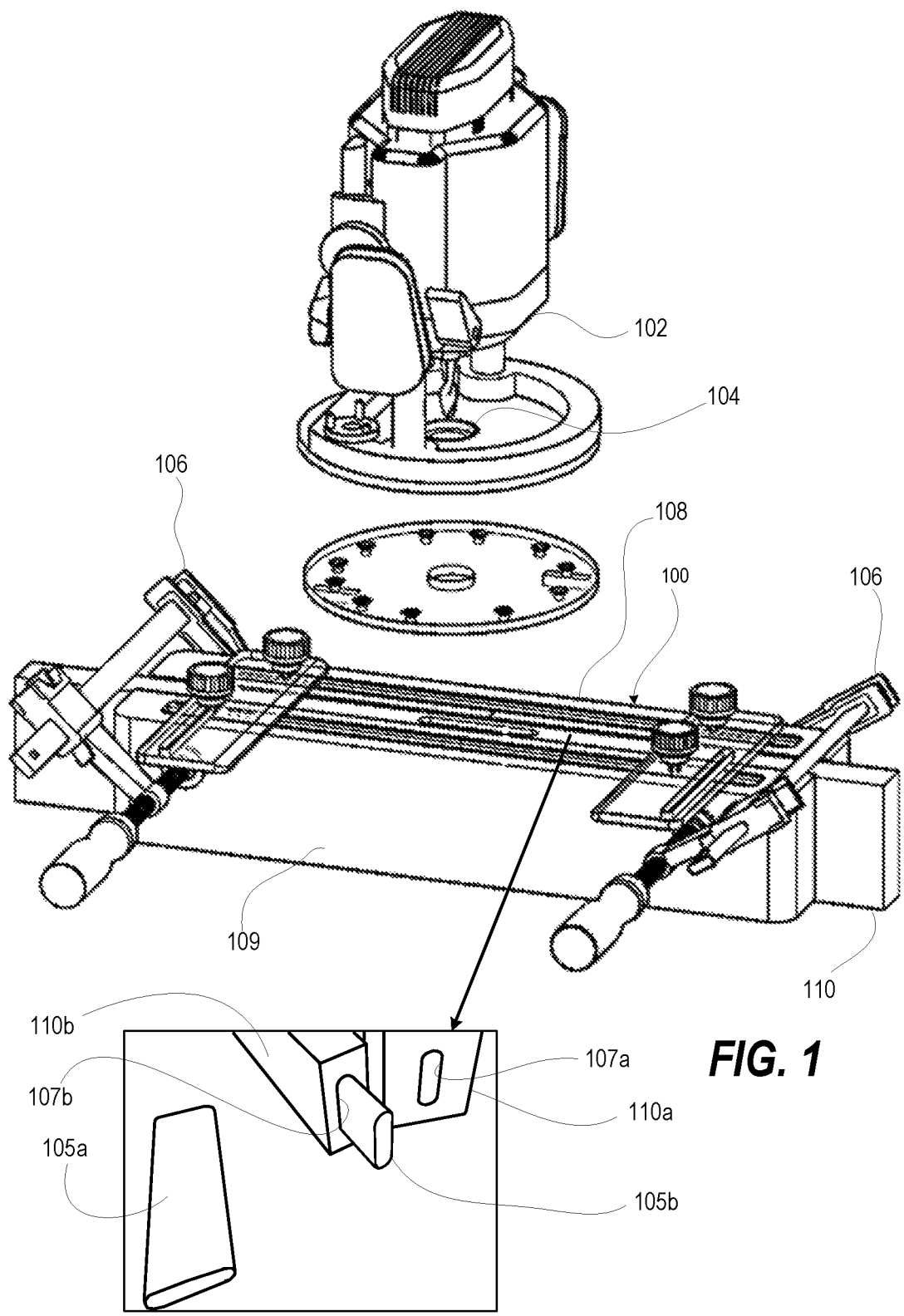
FIG. 1 is an exploded view of a mortise master jig, router, clamps, and work piece, according to one or more embodiments.
FIG. 2 is a perspective view of two work pieces having mortise and tenon joint components, according to one or more embodiments.

With reference to FIG. 1, mortise master jig 100 is a wood machining jig that is used in conjunction with a plunge router 102, guide bushing 104, and two clamps 106. Standard wood working type clamps 106 exert a clamping force on a fixed and a movable clamp plate 108, 109 to clamp work piece 110 there between. Mortise master jig 100 facilitates guiding the plunge router 102 in a very controlled way as to machine mortises, grooves, pockets, recesses, and other machined features in a wooden work piece 110. The mortise master jig 100 allows the user to specify and control both location, depth, and length of the machined area on the work piece 110.

FIG. 2 illustrates work pieces 110*a*-110*b* that each have receive a respective mortise 107*a*-107*b* that was plunge routed by mortise master jig 100 (FIG. 1). A tenon 105*a* is sized to be inserted into the mortise 107*a* of work piece 110*a*. Work piece 110*b* has tenon 105*b* inserted in 107*b*.

Figure 3:
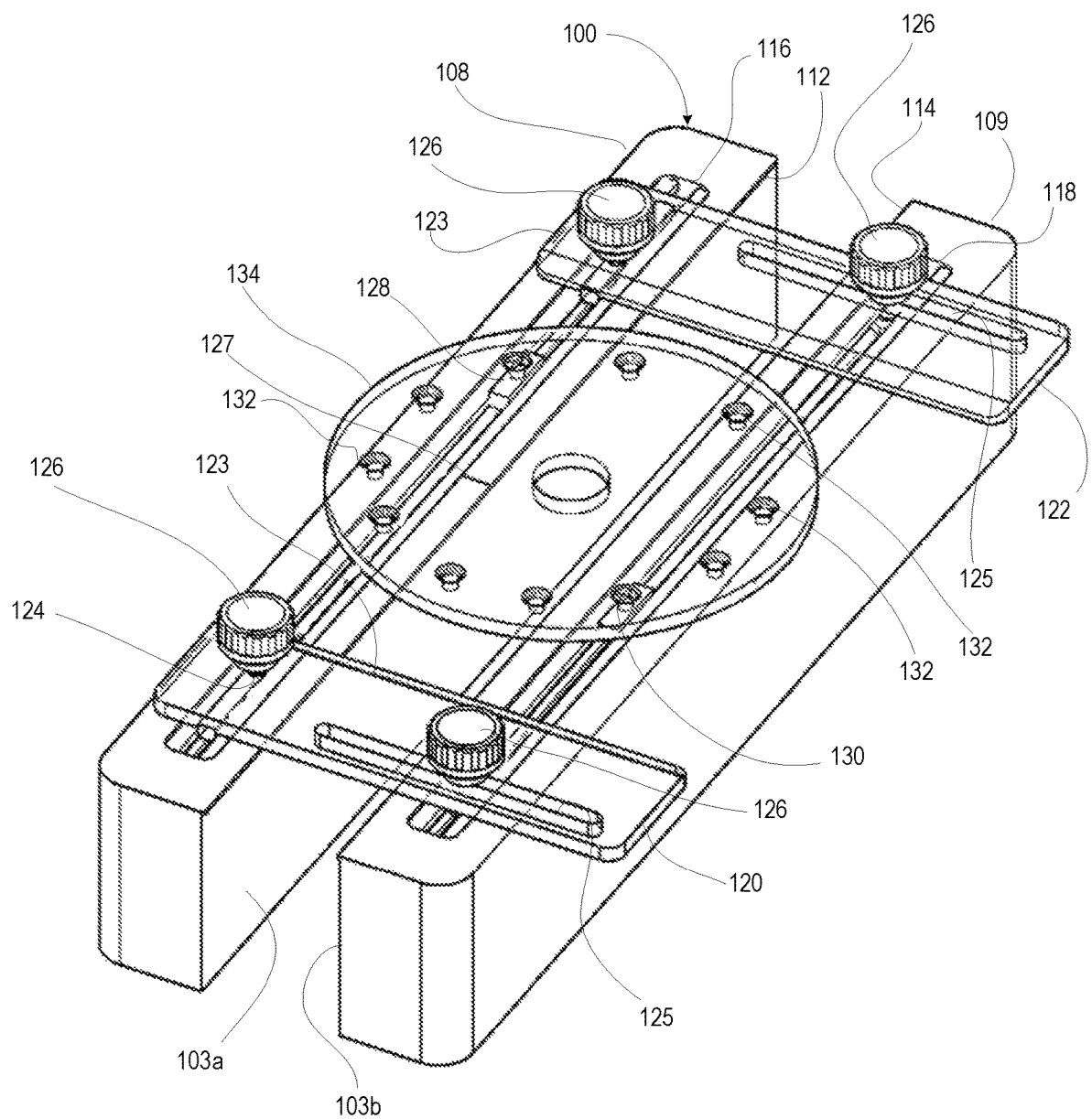
FIG. 3 is a three-dimensional view of the mortise master jig, according to one or more embodiments.

In FIG. 3, the fixed platen or clamp plate 108 and the movable platen or clamp plate 109 of the mortise master jig 100. The fixed clamp plate 108 presents a fixed vertical facing 103*a* to one side of a work piece 110. The movable clamp plate 109 presents a movable vertical facing 103*b* to an opposite side of the work piece 110. The fixed and movable vertical facings 103*a*-103*b* are topped respectively with a fixed side leveling lip 112 and a moving side leveling lip 114. Along the top surfaces adjacent to the fixed and movable side leveling lips 112, 114, are channels in parallel to the fixed and movable vertical facings 103*a*-103*b*. In one or more embodiments, the channels are respective fixed and movable tee tracks 116, 118 that are provided across the width respectively of the fixed and movable clamp plates 108, 109

First and second stops 120, 122 are each an elongate plate 123 having a hole 124 aligned with the fixed tee track 116. Each hole 124 receives a respective locking knob 126*a* that is adjustable between a locked and an unlocked position. In one or more embodiments, each locking knob 126*a* includes an internal nut (not shown) that selectively locks a respective headed bolt that is slidingly captured inside the fixed tee track 116. First and second stops 120, 122 each have a transverse slot 125 formed in the elongate plate 123. A corresponding locking knob 126*b* is aligned to the movable tee track 118 and adjustable between a locked and unlocked position. In the unlocked position, the locking knob 126*b* transversely moves in the transverse slot 125 with the movable clamp plate 109. In the unlocked position, the locking knob 126*b* enables longitudinal movement of the respective first and second stop 120, 122 along the movable tee track 118. In one or more embodiments, each locking knob 126*b* has an internal nut (not shown) that selectively locks a respective headed bolt that is slidingly captured inside the movable tee track 118. In one or more embodiments, an internal nut (not shown) slides linearly to a selected position inside the movable tee track 118 and engages a bolt (not shown) that extends from each locking knob 126. Each stop 120, 122 slides linearly to a selected position where corresponding locking knobs 126*a*-126*b* locked to limit the length of the machined area in the work piece 110. Once positioned the right and left stop are locked in position with the locking knobs 126. Fixed clamp plate 108 includes a centering line 127 to assist in centering a particular part of work piece 110 (FIG. 1). First and second glide blocks 128, 130 are installed into a set of mounting holes 132 in a slide plate 134. The different mounting holes 132 in the slide plate 134 allow for different locations of the machined feature in the work piece 110 (FIG. 1) with respect to the face of the work piece 110 (FIG. 1).

Figure 4:
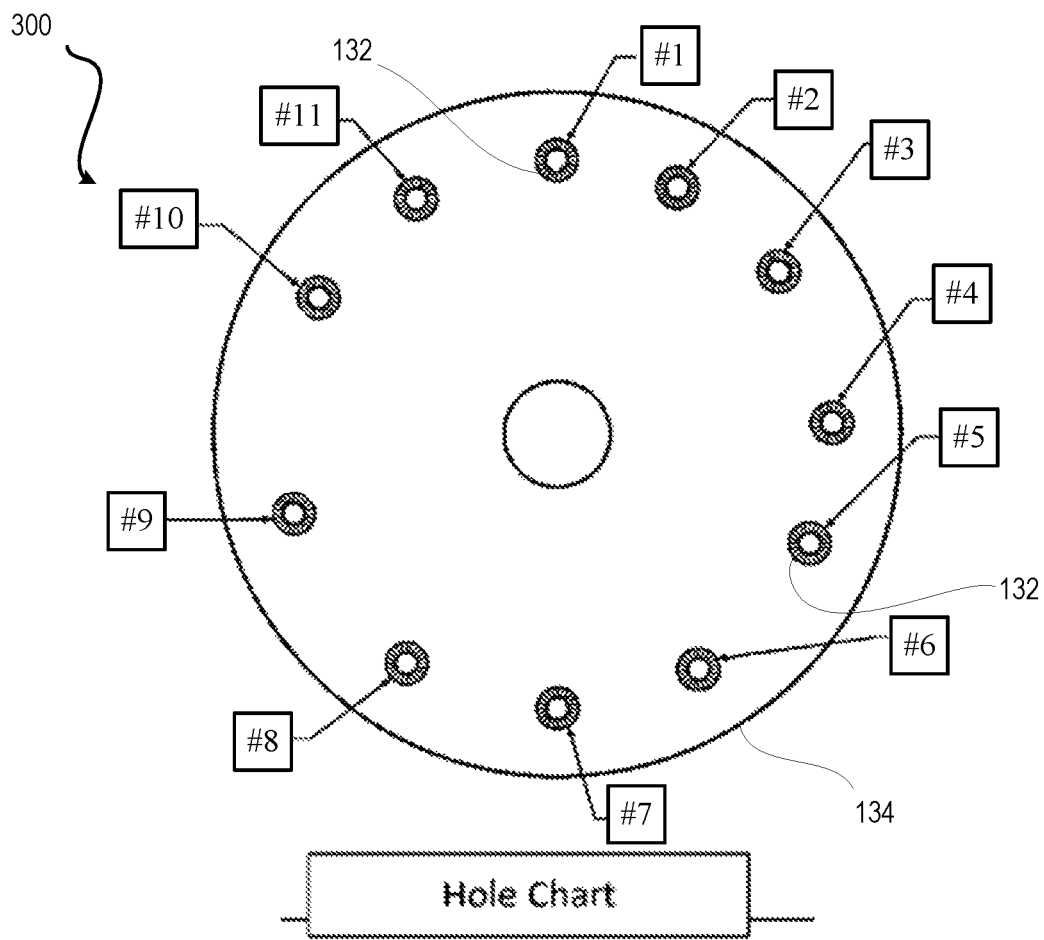
FIG. 4 is a top view of an example slide plate with hole dimension guide, according to one or more embodiments.

FIG. 4 is an example hole pattern chart 300 for the holes 132 in slide plate 134 (FIG. 2). The dimensions provided in hole pattern chart 300 are illustrative. A slide plate can include fewer or more pairs of holes with different selected offsets from the center of the slide plate to achieve different mortise locations. For clarity, pairs of same-numbered holes are described. However, additional offsets may be achieved by using holes of different numbers. For example, a chart could reference combinations of individually and uniquely numbered holes.

Figure 5:
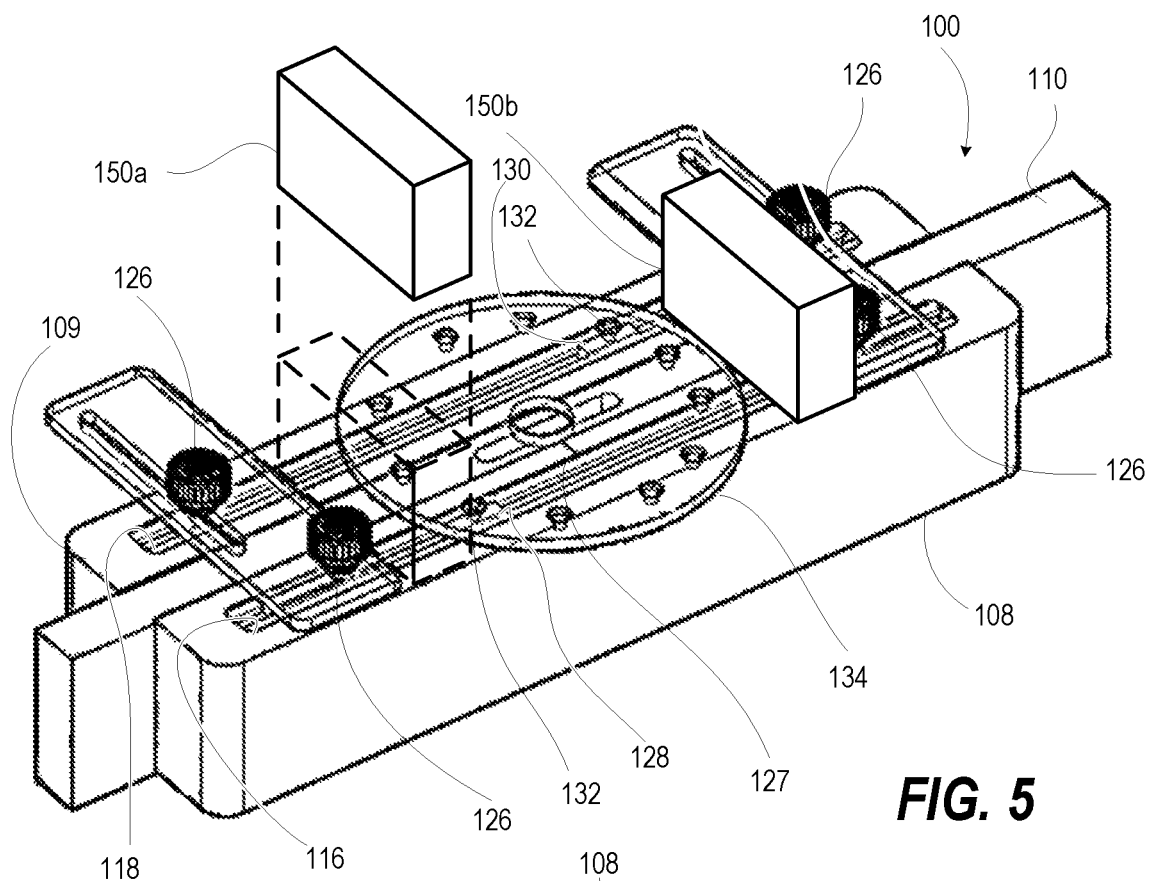
FIG. 5 is a top perspective view of the mortise master jig positioned with two setup blocks straddling a work piece for using an auto centering function, according to one or more embodiments.

FIG. 5 is a top perspective view of the mortise master jig 100 positioned with two setup blocks 150*a*-150*b* to make a properly centered and sized mortise length using the auto centering function. The mortise master jig 100 enables straddling the work piece 110 (FIG. 1) with first guide block 128 sliding along the top of the fixed tee track 116 and the second guide block 130 sliding along the top of the movable tee track 118. This arrangement facilitates creation of a machined feature in the center of the work piece width no matter the width of the work piece within the device width constraint of the mortise master jig 100. The slide plate 134 is setup using a pair of holes 132 with the desired alignment of the mortise relative to the centering line 127. The centering line 127 on the fixed clamp plate 108 is lined up a center mark 152 on work piece 110. With the four knobs 126*a*-126*b* loose, the two setup blocks 150*a*-150*b* are placed against each side of the slide plate 134. Each stop 120, 122 is inwardly slid into contact with the respective setup blocks 150*a*-150*b*. Then the knobs 126*a*-126*b* are tightened and the setup blocks 150*a*-150*b* are removed. The length of the mortise will be the diameter of the cutter used plus the width of the two setup blocks 150*a*-150*b*. For example, a ⅜-inch router bit and two half-inch setup block yields a 1⅜-inch mortise.

Figure 6:
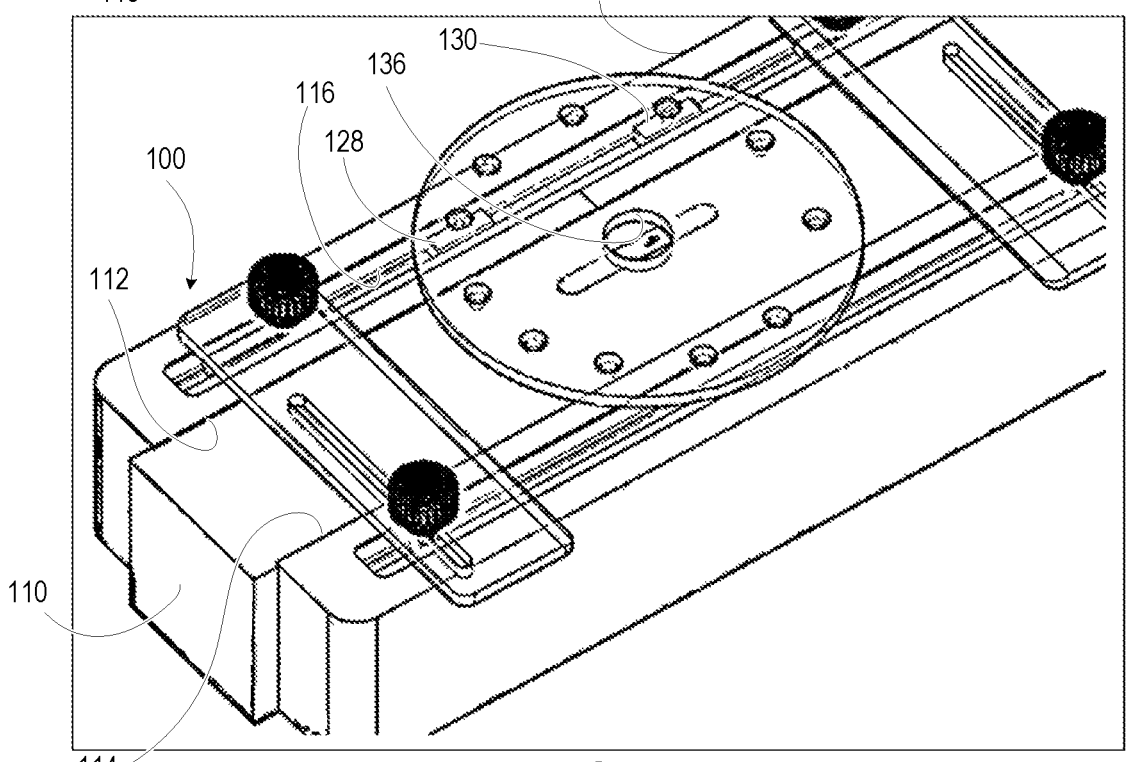
FIG. 6 is a top perspective view of the mortise master jig positioned with the two setup blocks on one side of a work piece, according to one or more embodiments.

FIG. 6 is a top perspective view of the mortise master jig 100 with both glide blocks 128, 130 installed into the fixed tee track 116 of the fixed clamp plate 108 on one side of the work piece 110 facilitating dimensioning the location of the machined feature from the face of the work piece 110 instead of the center of the work piece 110 (FIG. 1). Returning to FIG. 1, using the leveling lips 112, 114 to position the top surface of the work piece 110 (FIG. 1), the work piece 110 (FIG. 1) is clamped in and the stops 120, 122 and glide blocks 128, 130 are set, the plunge router 102 (FIG. 1) which is fitted with a standard guide bushing 104 (FIG. 1) is placed into a center diameter 136 of the slide plate 134. The router 102 (FIG. 1) is then guided from stop to stop 120, 122 machining the work piece 110.

Figure 7:
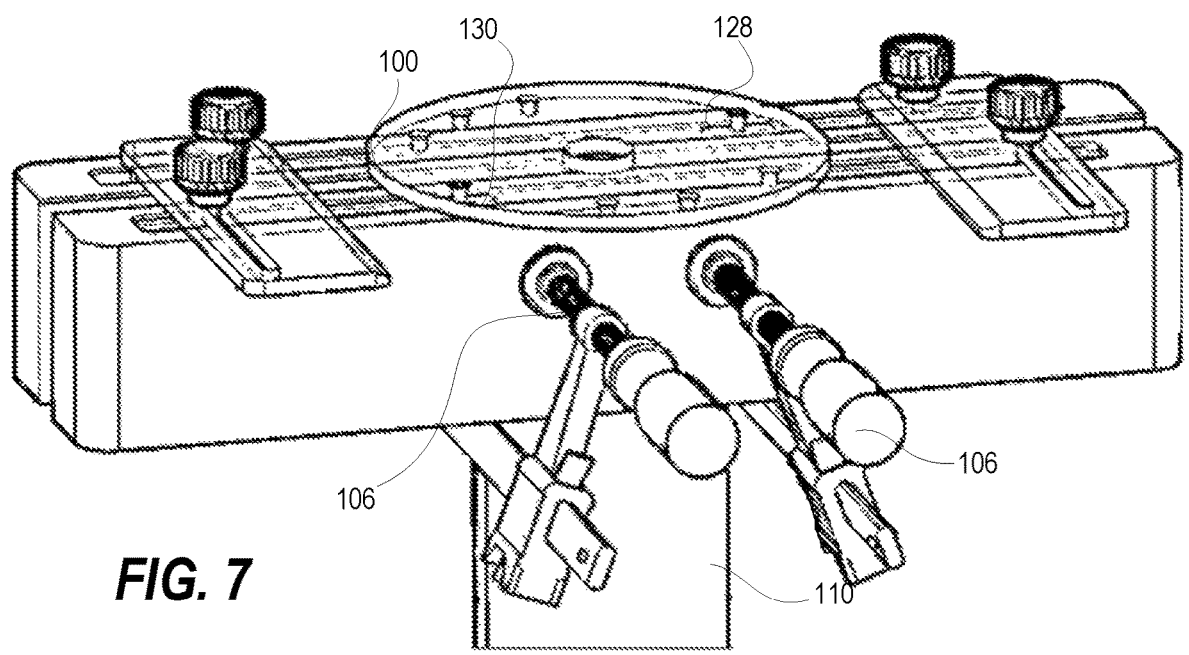
FIG. 7 is a side view of the mortise master jig in "edge mode" attached to an edge of a vertically positioned work piece, according to one or more embodiments.
Figure 8:
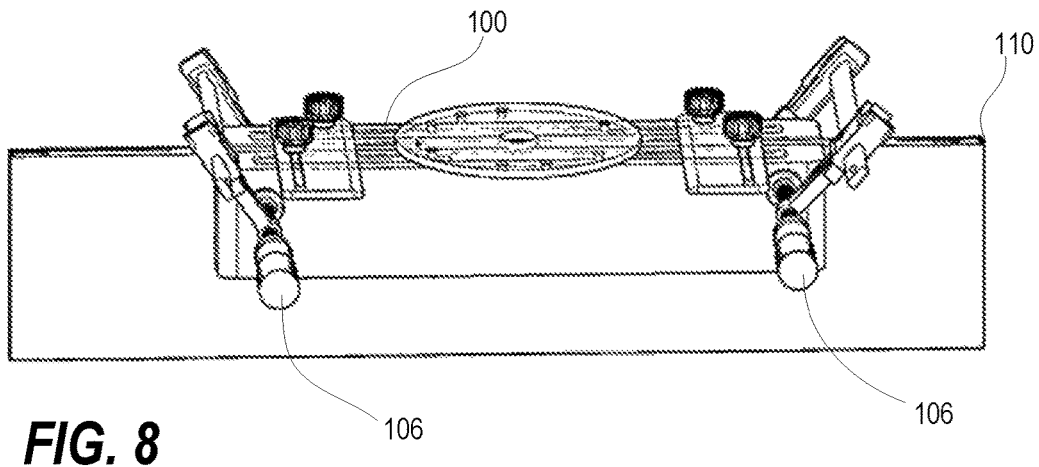
FIG. 8 is a side view of the mortise master jig in "middle mode" attached along a length of a horizontally positioned work piece, according to one or more embodiments.
Figure 9:
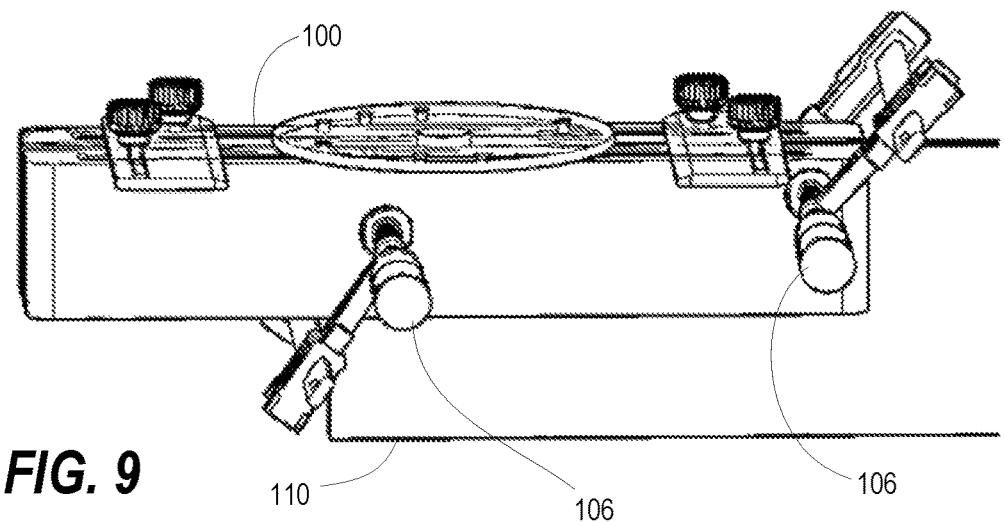
FIG. 9 is a side view of the mortise master jig in "end mode" attached along an end of a horizontally positioned work piece, according to one or more embodiments.

With reference to FIGS. 7-9, the mortise master jig 100 differs from other jigs by being capable of being clamped to the work piece 110. FIG. 5 is a side view of the mortise master jig 100 in "edge mode" attached to an edge of a vertically positioned work piece 110. FIG. 6 is a side view of the mortise master jig 100 in "middle mode" attached along a length of a horizontally positioned work piece 110. FIG. 7 is a side view of the mortise master jig 100 in "end mode" attached along an end of a horizontally positioned work piece 110. In each instance, a pair of clamps 106 are positioned to grip the mortise master jig 100 at each lateral extent of the work piece 110. Other jigs are mounted to a work surface such as a work bench then subsequently the work piece is attached to the jig. This feature affords much flexibility in machining large or awkward work pieces (such as tabletops or very long rails and stiles) and is one of the most attractive and unique features of the mortise master jig 100. With reference to FIG. 5, the auto centering function where the glide blocks 128, 130 straddle the work piece 110 is also one of the most convenient and unique features of the mortise master jig 100.

Figure 10:
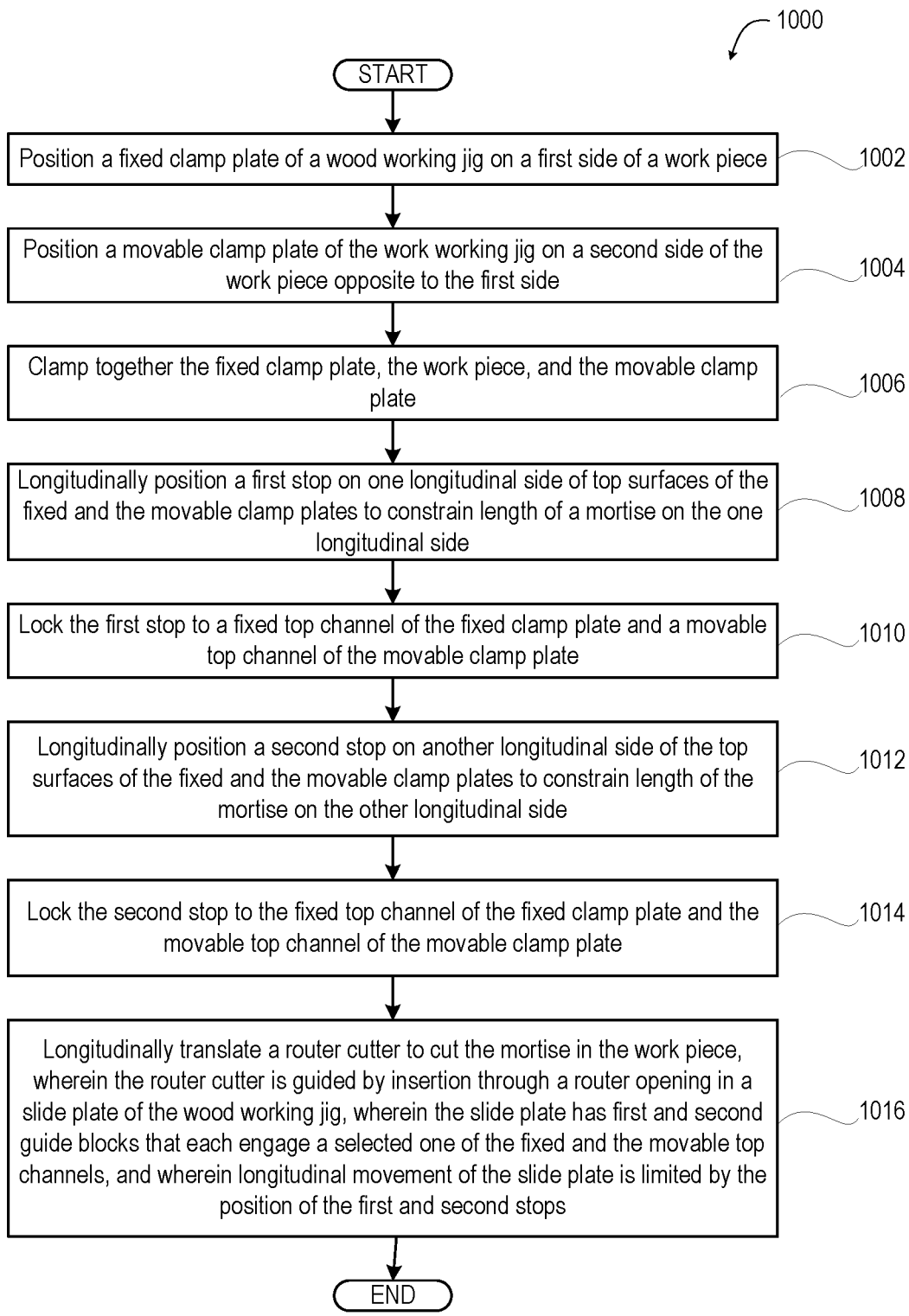
FIG. 10 presents a flow diagram of a method of making a mortise in a work piece using the mortise master jig of FIG. 1, according to one or more embodiments.

In use, FIG. 10 presents a flow diagram of a method 1000 of making a mortise in a work piece using the mortise master jig 100 (FIG. 1). Method 100 includes positioning a fixed clamp plate of a wood working jig on a first side of a work piece (block 1002). Method 1000 includes positioning a movable clamp plate of the work working jig on a second side of the work piece opposite to the first side (block 1004). Method 1000 includes clamping together the fixed clamp plate, the work piece, and the movable clamp plate (block 1006). Method 1000 includes longitudinally positioning a first stop on one longitudinal side of top surfaces of the fixed and the movable clamp plates to constrain length of a mortise on the one longitudinal side (block 1008). Method 1000 includes locking the first stop to a fixed top channel of the fixed clamp plate and a movable top channel of the movable clamp plate (block 1010). Method 1000 includes longitudinally positioning a second stop on another longitudinal side of the top surfaces of the fixed and the movable clamp plates to constrain length of the mortise on the other longitudinal side (block 1012). Method 1000 includes locking the second stop to the fixed top channel of the fixed clamp plate and the movable top channel of the movable clamp plate (block 1014). Method 1000 includes longitudinally translating a router cutter to cut the mortise in the work piece, wherein the router cutter is guided by insertion through a router opening in a slide plate of the wood working jig, wherein the slide plate has first and second guide blocks that each engage a selected one of the fixed and the movable top channels, and wherein longitudinal movement of the slide plate is limited by the position of the first and second stops (block 1016). Then method 1000 ends.

In one or more embodiments, method 1000 includes selecting an alignment position of the mortise by attaching an associated pair of holes in the slide plate comprising a circular disk. In one or more embodiments, method 1000 includes inserting the first guide block in the fixed top channel; inserting the second guide block in the movable top channel; and longitudinally translating the router cutter to cut the mortise in the work piece proximate to the fixed clamp plate. In one or more embodiments, method 1000 includes inserting the first guide block in the fixed top channel; and inserting the second guide block in the fixed top channel. In one or more particular embodiments, method 1000 further includes subsequently inserting the first guide block in the movable top channel; inserting the second guide block in the movable top channel; and longitudinally translating the router cutter to cut the mortise transversely wider in the work piece proximate to the movable clamp plate. In one or more embodiments, the order of using the fixed and the movable clamp plates is reversed.

With reference to FIG. 1, the mortise master jig 100 differs from other jigs by being capable of being clamped to the work piece 108 where other jigs are mounted to a work surface such as a work bench then subsequently the work piece is attached to the jig. This feature affords much flexibility in machining large or awkward work pieces (such as tabletops or very long rails and stiles) and is one of the most attractive and unique features of the mortise master jig 100. The auto centering function where the glide blocks straddle the work piece is also one of the most convenient and unique features of the device.

In embodiments of the present invention comprising a plurality of slots, a woodworker may additionally clamp a piece of wood-not intended for cutting a mortise-into place such that the piece of wood serves as a stop so that all cuts will be in the same place without marking the center. At this point, a woodworker is ready to cut mortises using the mortise jig. One of ordinary skill in the art will recognize that the invention may be used on multiple thin pieces of wood for "stepping" to make multiple mortises. Additionally, the user may plunge dowel holes with the jig; or use the invention for edge gluing by using dowels or mortises.

This invention is often made of durable material, which may include metal, plastic, or wood. Metal can come from machined aluminum, aluminum weldment or castings, or similar steel or alloy. Molded or machine plastic can be used with recommended strengthening and stiffening features like ribs or other sectioning techniques. In a preferred embodiment, the parts may compose black anodized aluminum for the body, aluminum centering tool, aluminum clamps, and plastic clamp adjusters. The particular thickness and other dimensions of the materials are not particularly important, so long as the pieces are necessarily durable for the purpose of securing a router during mortise cuts.

The invention may include any number of nuts, bolts, and screws for securing the various router stops and the clamps, locks, or mounting brackets in place. The length and width of the jig itself and the corresponding router stops adjusters, brackets, and locks, and clamps may be of varying dimension. The user, however, will note that the dimensions must be of appropriate length to accommodate commercially available routers for creating mortises.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:
1. A wood working jig comprising:
    a fixed clamp plate having a fixed top channel and positionable on a first side of a work piece;
    a movable clamp plate having a movable top channel and positionable on a second side of the work piece opposite to the first side, the fixed and the movable clamp plates configured to be clamped to the work piece with wood clamps;
    a first stop engageable between the fixed and the movable top channels;
    a second stop engageable between the fixed and the movable top channels;
    a slide plate having first and second guide blocks that each engage a selected one of the fixed and the movable top channels to guide translation of a router opening in the slide plate between the first and second stops.

2. The wood working jig of claim 1, wherein the slide plate comprises a circular disk having annularly spaced pairs of holes that engage respective ones of the first and second guide blocks, the holes spaced from the router opening in the slide plate to align router opening to selected position along the work piece.

3. The wood working jig of claim 2, wherein the first guide block is received in the fixed top channel and the second guide block is received in the movable top channel.

4. The wood working jig of claim 2, wherein the first guide block is received in the fixed top channel and the second guide block is received in the fixed top channel.

5. The wood working jig of claim 2, wherein:
the slide plate comprises a transparent material; and
at least one of the fixed and the movable clamp plates comprises a centering mark visible through the slide plate and that enables longitudinally centering the workpiece between the fixed and the movable clamp plates.

6. The wood working jig of claim 1, wherein at least one of the fixed and the movable clamp plates comprises a centering mark that enables longitudinally centering the workpiece between the fixed and the movable clamp plates.

7. The wood working jig of claim 1, wherein each of the first and the second stops comprise:
an elongate plate having a hole aligned with the fixed tee track and transverse slot;
a first locking knob is adjustably received in the first hole and engaged for sliding movement in the first tee track of the fixed clamp plate, the first locking knob adjustable between a locked and an unlocked position; and
a second locking knob is adjustably received in the transverse slot hole and slidingly engaged in the movable tee track, the second locking knob adjustable between a locked and an unlocked position.

8. The wood working jig of claim 1, further comprising at least one clamp positionable to grip outer sides of the fixed and the movable clamp plates to clamp the work piece there between.

9. A method of forming a mortise in a work piece, the method comprising:
positioning a fixed clamp plate of a wood working jig on a first side of a work piece;
positioning a movable clamp plate of the work working jig on a second side of the work piece opposite to the first side;
clamping together the fixed clamp plate, the work piece, and the movable clamp plate;
longitudinally positioning a first stop on one longitudinal side of top surfaces of the fixed and the movable clamp plates to constrain length of a mortise on the one longitudinal side;
locking the first stop to a fixed top channel of the fixed clamp plate and a movable top channel of the movable clamp plate;
longitudinally positioning a second stop on another longitudinal side of the top surfaces of the fixed and the movable clamp plates to constrain length of the mortise on the other longitudinal side;
locking the second stop to the fixed top channel of the fixed clamp plate and the movable top channel of the movable clamp plate; and
longitudinally translating a router cutter to cut the mortise in the work piece, the router cutter guided by insertion through a router opening in a slide plate of the wood working jig, the slide plate having first and second guide blocks that each engage a selected one of the fixed and the movable top channels, longitudinal movement of the slide plate limited by the position of the first and second stops.

10. The method of claim 9, further comprising selecting an alignment position of the mortise by attaching an associated pair of holes in the slide plate comprising a circular disk.

11. The method of claim 9, further comprising:
inserting the first guide block in the fixed top channel; and
inserting the second guide block in the movable top channel.

12. The method of claim 9, further comprising:
inserting the first guide block in the fixed top channel;
inserting the second guide block in the fixed top channel; and
longitudinally translating the router cutter to cut the mortise in the work piece proximate to the fixed clamp plate.

13. The method of claim 12, further comprising:
inserting the first guide block in the movable top channel;
inserting the second guide block in the movable top channel; and
longitudinally translating the router cutter to cut the mortise transversely wider in the work piece proximate to the movable clamp plate.

* * * * *